United States Patent [19]
Johnston

[11] 3,716,503
[45] Feb. 13, 1973

[54] STABILIZED SURGICAL ADHESIVE

[75] Inventor: John Johnston, Michigan City, Ind.

[73] Assignee: Scholl, Inc., Chicago, Ill.

[22] Filed: Oct. 19, 1970

[21] Appl. No.: 82,110

[52] U.S. Cl..................260/3, 117/122 PA, 260/4 R, 260/17.4 BB, 260/17.4 ST, 260/27 BB, 260/41.5 R, 260/829, 260/876 B, 260/888, 260/889, 260/31.2 MR

[51] Int. Cl..............................C08d 9/12, C08c 9/18

[58] Field of Search........260/3, 27 BB, 4 R, 17.4 BB, 260/17.4 ST; 117/122 PA

[56] References Cited

UNITED STATES PATENTS

| | | | |
|---|---|---|---|
| 2,767,152 | 10/1956 | Bierman et al. | 260/27 BB |
| 2,692,245 | 10/1954 | Groves et al. | 260/27 BB |
| 2,880,184 | 3/1959 | Groves et al. | 260/3 |
| 2,559,990 | 7/1951 | Oace et al. | 260/27 BB |
| 2,459,891 | 1/1949 | Nelson et al. | 260/27 BB |
| 2,964,422 | 12/1960 | Bergstedt et al. | 117/122 PA |

*Primary Examiner*—John C. Bleutge
*Attorney*—Hill, Sherman, Meroni, Gross & Simpson

[57] ABSTRACT

Adhesive mass for surgical tape including a rubbery elastomer, zinc resinate, a filler or reinforcing agent and preferably a neutral resin.

4 Claims, No Drawings

STABILIZED SURGICAL ADHESIVE

BACKGROUND OF THE INVENTION

2. Field of the Invention

This invention is in the field of adhesive masses for surgical tapes, the masses including controlled amounts of zinc resinate for the purpose of accurately controlling the adhesion and tack characteristics of the product, instead of relying upon the production of zinc resinate in uncontrolled amounts as exists in current manufacturing practice.

2. Description of the Prior Art

In the manufacture of adhesive masses for surgical adhesive tapes, the most widely used components are an elastomer such as natural rubber, in combination with one or more tackifying resins and a filler such as zinc oxide. Other components may be added for modification of various characteristics but in the main, the three ingredients mentioned above are basic to any commercial rubber based surgical adhesive.

The tackifying resins commonly employed in such masses are slightly acidic. In manufacturing the adhesive, a reaction takes place between the acidic resin and the zinc oxide present, forming a material known as zinc resinate. Although the tackifying resins are basically esters of abietic acid, in most cases these resins are far from pure, containing twenty or more miscellaneous components. Because of this characteristic, it is impossible to clearly define the exact nature of the zinc salts formed. Whatever the nature of the salts, however, their formation firms up the adhesive to give it an entirely new viscoelastic characteristic. If the tackifying resin used were neutral, the adhesive would be too soft and would result in stringing and possibly adhesive transfer due to this stringy nature. This characteristic becomes even more critical when using the newer synthetic polymers such as the synthetic polyisoprenes which are much softer than natural rubber and tend to make a much more stringy adhesive.

The disadvantage arising from the present manufacturing process is that the formation of zinc resinate is uncontrollable. Studies made some time ago indicate that the amount of zinc resinate formed is very much dependent on time and temperature. As manufacturing techniques unavoidably vary somewhat in both temperature and time, the amount of zinc resinate formation is also variable with the result that the desired adhesion and tack characteristics cannot always be achieved with precision.

SUMMARY OF THE INVENTION

The adhesive mass of the present invention contains controlled amounts of zinc resinate, preferably in combination with a neutral resin. The elastomer in the composition may be either natural rubber or one of the synthetic isoprene polymers or copolymers. The rubbery elastomer is included in an amount of from 25 to 35 percent by weight, the zinc resinate in an amount of from 3 to 40 percent, a filler or reinforcing agent is added in an amount of from 10 to 35 percent, and the neutral resin is added in an amount up to 37 percent by weight. The filler or reinforcing agent may be zinc oxide, but since there are no acid acting resinous components in the composition, no additional amounts of zinc resinate are formed.

Other objects, features and advantages of the invention will be readily apparent from the following description of certain preferred embodiments thereof, although variations and modifications may be effected without departing from the spirit and scope of the novel concepts of the disclosure.

DESCRIPTION OF THE PREFERRED EMBODIMENTS

The adhesive mass of the present invention contains from 25 to 35 percent of a rubbery elastomer or blend of elastomers. This material may be natural rubber of the pale crepe or smoked sheet variety or it may be one or more of the synthetic polyisoprenes or polyisoprene copolymers, of the type available commercially under the following trade names:

Polyisoprenes
Shell Isoprene 309
Goodyear Natsyn 405
Goodyear Natsyn 400
Goodyear Natsyn 200
Goodrich Ameripol SN 600
Polyisoprene-polystyrene block copolymers
Shell 1107

Particularly good results are obtained when the elastomer is a blend containing from 10–90 percent natural rubber and 90–10 percent of a synthetic elastomer of the types described above.

The zinc resinate used is preferably one which has a melting point, by the ring and ball method, not in excess of about 120° C., and preferably from 80° to 105° C., so that it can be used directly in the formulation. Zinc resinates with higher melting points can be used, however, by melting them or by dissolving them in a suitable solvent. The following list sets forth some of the commercially available zinc resinates which can be used for the purposes of the present invention:

| Zinc resinate | Melting point (ring and ball) |
|---|---|
| Tenneco Zinc Resinate 433–44 | 100°C. |
| Tenneco 449–151 | 85°C. |
| Tenneco 449–167 | 85°C. |
| Hercules Pexate RT4023 | 98°C. |
| Hercules X17880–4 | 82°C. |
| Hercules Pexate 549 | 170°C. |
| Hercules Pexate 329 | 165°C. |
| Hercules Pexate 510E | 118°C. |
| Hercules Pexate 511 | 142°C. |
| Tenneco Zirex | 132°C. |
| Tenneco Zitro | 132°C. |

The zinc resinate is present broadly in an amount of from 3 to 40 percent by weight of the mixture, and more preferably in an amount of from 3 to 20 percent by weight. The neutral resin employed in the present invention is preferably of the hydrocarbon type, in amounts up to 37 percent by weight, and preferably from 12 to 20 percent by weight. Hydrocarbon resins suitable for this purpose are readily available from petroleum chemicals and coal tar. Suitable resins include polyindenes, coumarone-indenes, terpenes and their derivatives, polybutenes, polyisobutylenes and other thermoplastic hydrocarbon resins.

The composition may also include a filler or reinforcing agent such as titanium dioxide, zinc oxide, hydrated silica, aluminum silicate, or aluminum hydrate in amounts ranging from 10 to 35 percent by weight.

Since the composition contains no acid acting resins, the introduction of zinc oxide as a reinforcing agent does not introduce additional amounts of zinc resinate into the composition during processing.

Starch can also be added in amounts of from 0 to 15 percent by weight and preferably from 5 to 10 percent by weight. Plasticizers and modifiers such as mineral oil, hydrogenated polybutene having a molecular weight of about 3,000 to 20,000, lanolin, beeswax, and other conventional plasticizers and modifiers can be added in amounts from 0 to 15 percent, and preferably from 3 to 7 percent.

Any adhesive mass of this type usually contains an antioxidant, in amounts up to 2 percent by weight, with the preferred percentage being from 0.1 to 2.0 percent. A typical antioxidant for use in this connection is "Agerite Gel" which consists of ditolylamines in combination with a petroleum wax. However, other antioxidants commonly employed in adhesive masses can also be used in the new composition.

Through the introduction of controlled amounts of zinc resinate, the adhesive formulations of the present invention are not dependent on process variables to achieve a predetermined balance between adhesion and tack.

The following examples are given to illustrate the formulations based upon different rubbery elastomers and mixtures thereof.

EXAMPLE 1

The following formulation is based upon 100 percent natural rubber.

|  | lbs. |
|---|---|
| Pale Crepe Rubber | 100 |
| Zinc oxide | 84 |
| Starch | 21 |
| Lanolin | 4.5 |
| Neville NevChem 100 Neutral Hydrocarbon Resin | 60 |
| Tenneco 434-44 Zinc Resinate | 60 |
| Polyvis 30SH Polyisobutylene | 9 |
| Agerite Gel Antioxidant | 1 |

EXAMPLE 2

The following formulation is based upon 100 percent synthetic polyisoprene.

| Natsyn 400 | 100 |
|---|---|
| Zinc oxide | 84 |
| Starch | 21 |
| Lanolin | 4.5 |
| polyvis 30SH Polyisobutylene | 9 |
| Hercules RT4023 Zinc Resinate | 60 |
| Goodyear RWC 3814 Neutral Hydrocarbon Resin | 60 |
| Agerite Gel Antioxidant | 1 |

EXAMPLE 3

The following formulation is based upon a blend of synthetic elastomers.

|  | lbs. |
|---|---|
| Ameripol SN600 Polyisoprene | 72 |
| Shell 1107 Isoprene-Styrene block copolymer | 28 |
| Zinc Oxide | 84 |
| Starch | 21 |
| Lanolin | 4.5 |
| Polyvis 30SH Polyisobutylene | 9 |
| Neville NevChem 100 Neutral hydrocarbon Resin | 45 |
| Tenneco 449-167 Zinc Resinate | 60 |
| Goodyear Wingstay L Antioxidant | 0.25 |

EXAMPLE 4

The following formulation is based on a blend of natural and synthetic elastomers.

| Pale Crepe Rubber | 25 |
|---|---|
| Shell 309 Polyisoprene | 75 |
| Zinc Oxide | 84 |
| Starch | 21 |
| Lanolin | 4.5 |
| Polyvis 30SH Polyisobutylene | 9 |
| Hercules X17880-4 Zinc Resinate | 55 |
| Goodyear RWC3814 Neutral Hydrocarbon Resin | 50 |
| Goodyear Wingstay L Antioxidant | 0.25 |

All of the formulations of the foregoing examples gave excellent adhesion to skin and to their own backing, and are ideally suited for use as surgical adhesives. All of the formulations are showed excellent aging characteristics.

I claim as my invention:

1. An adhesive mass for surgical tapes consisting essentially of 100 parts by weight of rubbery elastomer from the group consisting of natural rubber, synthetic polyisoprenes and polyisoprene block polymers, 21 parts of starch, 4.5 parts of lanolin, 45–60 parts of neutral hydrocarbon resin, 55–60 parts of zinc resinate, 9 parts of polyisobutylene and 0.25 to 1 part of antioxidant.

2. The adhesive mass of claim 1 in which said zinc resinate has a melting point not in excess of 120° C.

3. The adhesive mass of claim 1 in which said rubbery elastomer is natural rubber.

4. The adhesive mass of claim 1 in which said rubbery elastomer is a synthetic polyisoprene.

* * * * *